US 6,654,854 B1

(12) United States Patent
Janakiraman et al.

(10) Patent No.: US 6,654,854 B1
(45) Date of Patent: Nov. 25, 2003

(54) CACHING METHOD USING CACHE TAG AND CACHE DATA STORED IN DYNAMIC RAM EMBEDDED IN LOGIC CHIP

(75) Inventors: Gopalakrishnan Janakiraman, Santa Clara, CA (US); Fong Pong, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/344,460

(22) Filed: Jun. 25, 1999

(51) Int. Cl.[7] .............................................. G06F 12/00
(52) U.S. Cl. ....................................... 711/118; 711/170
(58) Field of Search ..................... 712/24, 37; 711/105, 711/118, 170, 3, 100, 128, 140, 146, 122

(56) References Cited

U.S. PATENT DOCUMENTS

| | | | |
|---|---|---|---|
| 5,067,078 A | * | 11/1991 | Talgam et al. ................. 711/3 |
| 5,325,504 A | * | 6/1994 | Tipley et al. ................. 711/128 |
| 5,692,152 A | * | 11/1997 | Cohen et al. ................. 711/140 |
| 5,717,648 A | * | 2/1998 | Davis et al. ............ 365/230.06 |
| 5,727,180 A | * | 3/1998 | Davis et al. ................. 711/100 |
| 5,809,537 A | * | 9/1998 | Itskin et al. ................. 711/146 |
| 5,813,036 A | * | 9/1998 | Ghosh et al. ................. 711/146 |
| 5,826,052 A | * | 10/1998 | Stiles et al. ................. 712/205 |
| 5,829,026 A | * | 10/1998 | Leung et al. ................. 711/122 |
| 6,006,310 A | * | 12/1999 | Klein ........................... 711/128 |
| 6,026,478 A | * | 2/2000 | Dowling ....................... 712/24 |

* cited by examiner

Primary Examiner—David Hudspeth
Assistant Examiner—Fred F. Tzeng

(57) ABSTRACT

A caching method for using cache tag and cache data stored in dynamic RAM embedded in a logic chip. In general, there are at least two cache applications where this method can be employed. First, there are caches integral to a processor and interfaced to a processor pipeline. Second, there are caches external to a processor and interfaced with a shared bus.

6 Claims, 11 Drawing Sheets

CACHING METHOD USING CACHE TAG AND CACHE DATA STORED IN DYNAMIC RAM EMBEDDED IN LOGIC CHIP

BACKGROUND OF THE INVENTION

1. Field of Invention

The present invention relates generally to the field of computer system memory and pertains more particularly to a caching method using cache tag and cache data stored in dynamic RAM embedded in a logic chip.

2. Discussion of the Prior Art

Modern computer systems are often comprised of multiple forms and locations of memory. The memory subsystem is typically organized hierarchically. For example, from cache memory of various levels at the top to main memory and finally to hard disc memory. A processor in search of data or instructions looks first in the cache memory, which is closest to the processor. If the information is not found there, then the request is passed next to the main memory and finally to the hard disc. The relative sizes and performance of the memory units are conditioned primarily by economic considerations. Generally, the higher the memory unit is in the hierarchy the higher its performance and the higher its cost. For reference purposes, the memory subsystem will be divided into "caches" and "memory." The term memory will cover every form of memory other than caches. Information that is frequently accessed is stored in caches and information that is less frequently accessed is stored in memory. Caches allow higher system performance because the information can typically be accessed from the cache faster than from the memory. Relatively speaking, this is especially true when the memory is in the form of a hard disk.

A cache consists of a cache data portion and a cache tag portion. The cache data portion contains the information that is currently stored in the cache. The cache tag portion contains the addresses of the locations where the information is stored. Generally, the cache data will be larger than the cache tags. The cache data and the cache tags will not necessarily be stored together depending on the design. When a specific piece of information is requested, one or more of the cache tags are searched for the address of the requested information. Which cache tags are searched will depend on the cache design. If the address of the requested information is present in the cache tags, then the information will be available from that address in the cache data. If the address is not present, then the information may be available from memory.

In general, there are two cache applications that will be considered. First, there are caches integral to a processor and interfaced to a processor pipeline. Second, there are caches external to a processor and interfaced with a shared bus. Caches must be designed in such a way that their latency meets the timing requirements of the requesting components such as the processor pipeline or the shared bus. For example, consider the design of the shared bus. A cache or other agent on the bus that requires a specific piece of information will issue the address of the information on the bus. This is known as the address phase. Subsequently, all caches or other agents attached to the bus must indicate whether the information at the issued address is located there. This is known as the snoop phase. Typically, the bus design specifies that the cache must supply its snoop response within a fixed time interval after the address has been issued on the bus. If the cache is not designed to satisfy this timing requirement, it will lead to sub-optimal usage of the bus thus lowering system performance.

Examples of prior art systems will now be discussed in greater detail. Turning first to FIGS. 1–3, block diagrams of a processor 10 having an integral cache 12 that is interfaced to a processor pipeline 14 are shown. The processor 10 further consists of a register file 16, an address buffer 18, and a data buffer 20. The various elements are connected together by unidirectional and bi-directional conductors as shown. When the cache 12 of FIG. 1 is integral to the processor 10, conventionally both the cache tags and the cache data are stored in fast static random access memory (SRAM) technology. In general, such an implementation is shown as cache 12 in FIG. 2. Sometimes, insufficient cache is provided integral to the processor, so a supplemental cache is provided external to the processor. Such an implementation is shown as caches 12a and 12b in FIG. 3. Among the drawbacks to implementations of caches exclusively in SRAM are that, relatively speaking, SRAM is expensive, is less dense, and uses more power than dynamic random access memory (DRAM) technology.

With reference to FIGS. 4–6, block diagrams of a cache 12 external to a processor 10 and interfaced with a shared bus 22 are shown. Also interfaced with the shared bus 22 is a memory 24. The cache 12 and the memory 24 are interfaced with the shared bus 22 through a bus interface 26 as shown. When the cache 12 of FIG. 4 is external to the processor 10, conventionally the cache tags are stored in a SRAM cache and the cache data is stored in a DRAM cache. In one implementation, both the SRAM cache 12a containing cache tags and the DRAM cache 12b containing cache data are external to the bus interface 26 as shown in FIG. 5. In another implementation, only the DRAM cache 12b containing cache data is external to the bus interface 26 while the SRAM cache 12a containing cache tags is integral to the bus interface as shown in FIG. 6. Among the drawbacks to these implementations are that the latency of accessing the cache data is long since it is stored in slower DRAM external to the logic chip. This may force a delay in transferring data to the shared bus thus degrading the system performance. Further, when the cache tags are implemented in SRAM embedded on the logic chip, the size of the cache is limited by the higher cost, the lower density, and the greater power consumption of SRAM.

A definite need exists for a system having an ability to meet the latency timing requirements of the requesting components of the system. In particular, a need exists for a system which is capable of accessing cache memory in a timely manner. Ideally, such a system would have a lower cost and a higher capacity than conventional systems. With a system of this type, system performance can be enhanced. A primary purpose of the present invention is to solve this need and provide further, related advantages.

SUMMARY OF THE INVENTION

A caching method is disclosed for using cache tag and cache data stored in dynamic RAM embedded in a logic chip. In general, there are at least two cache applications where this method can be employed. First, there are caches integral to a processor and interfaced to a processor pipeline. Second, there are caches external to a processor and interfaced with a shared bus.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

Figure 5:
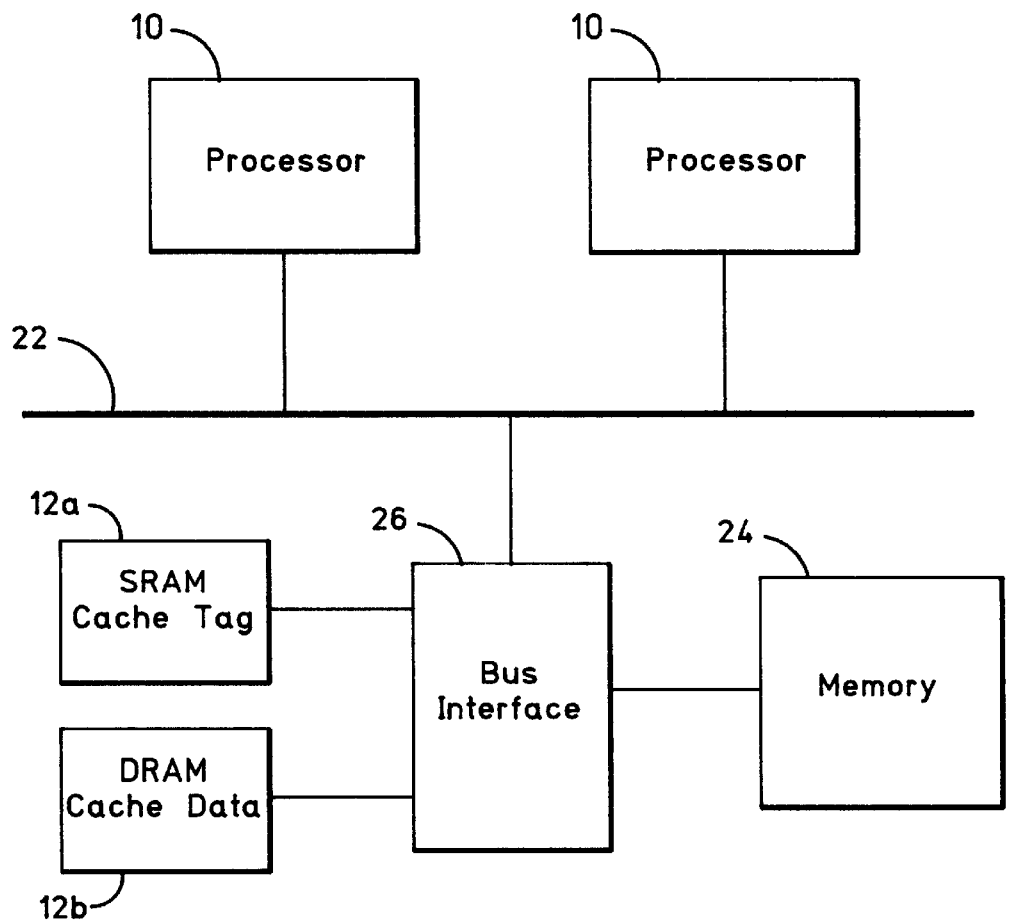
FIG. 5 is a prior art block diagram of a SRAM cache containing cache tags and a DRAM cache containing cache data both of which are external to a processor and interfaced with a shared bus.
Figure 6:
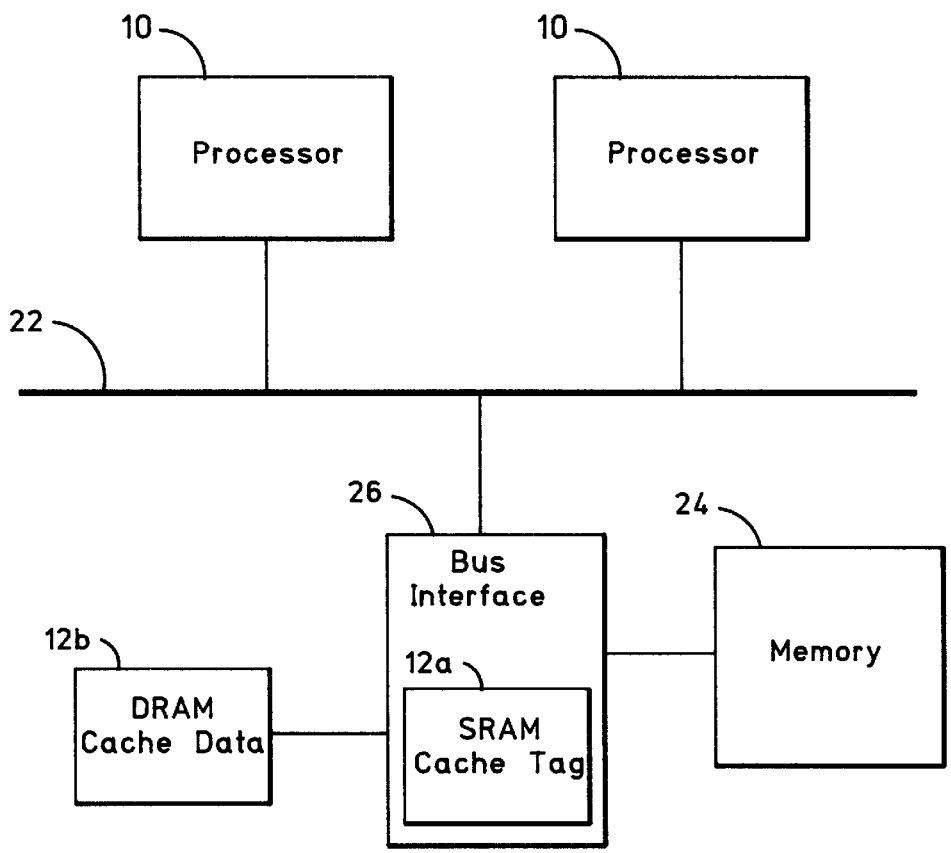
FIG. 6 is a prior art block diagram of a DRAM cache containing cache data and a SRAM cache containing cache tags which is integral to a bus interface both of which are external to a processor and interfaced with a shared bus.
Figure 7:
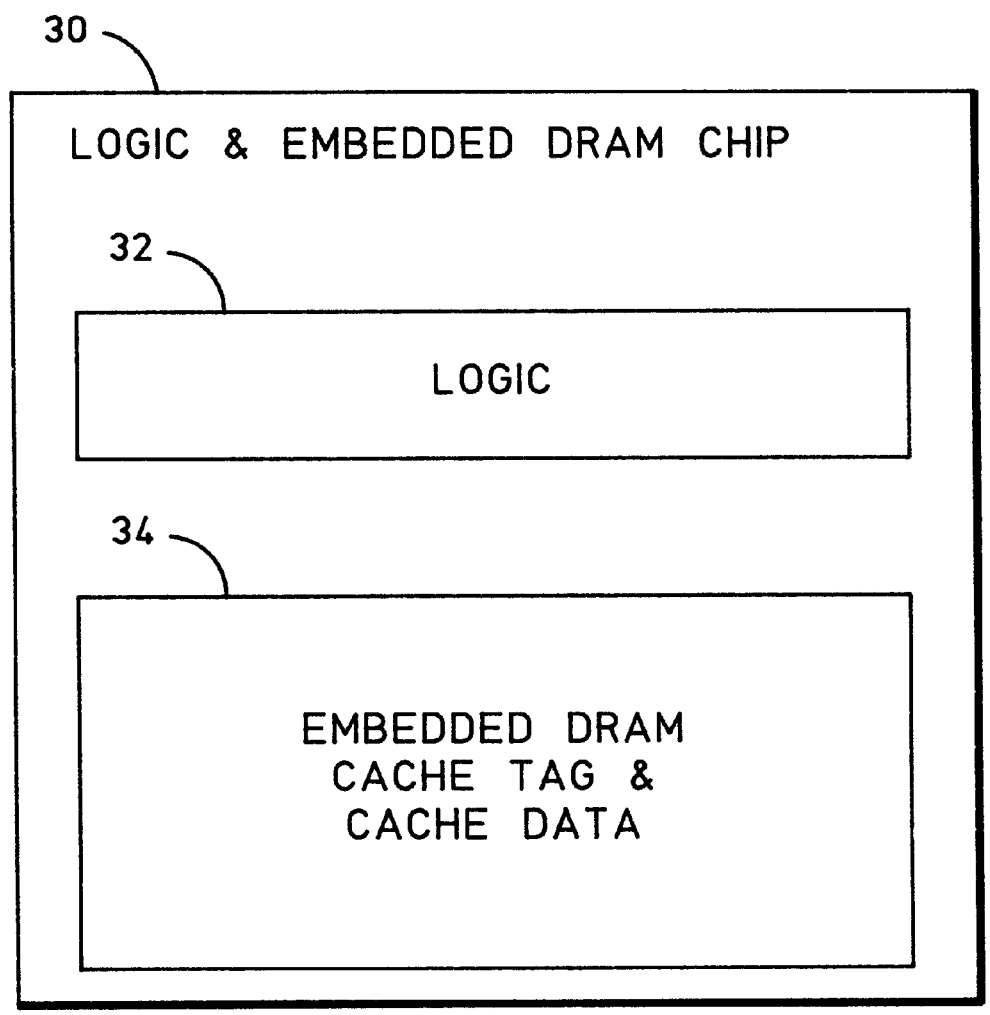
FIG. 7 is a block diagram of a logic chip having embedded logic and embedded DRAM cache containing cache tag and cache data according to one embodiment of the present invention.

Turning now to FIG. 7, a block diagram of a logic chip 30 having embedded logic 32 and embedded DRAM cache 34 containing cache tag and cache data according to one embodiment of the present invention is shown. The embedded logic 32 can be any of a wide variety of logic that is well known to one of ordinary skill in the art. For example, the embedded logic 32 may be a floating point unit or a bus interface. In general, there are at least two cache applications where this method can be employed. First, there are caches integral to a processor and interfaced to a processor pipeline. Second, there are caches external to a processor and interfaced with a shared bus. For example, in a shared bus design, the embedded DRAM cache 34 can be accessed within the minimum time delay specified between the address and snoop phases of the shared bus. The latency of accessing the embedded DRAM cache 34 is substantially lower than accessing the external DRAM cache 12b as in FIGS. 5 and 6 above. Among the advantages of the method of the present invention are that the embedded DRAM cache results in a cache with a larger capacity than a cache implemented with an integral SRAM as DRAM is cheaper, is more dense, and consumes less power. Further, by storing both the cache tags and the cache data in embedded DRAM, the method of the present invention allows for simpler cache interface logic than designs employing both SRAM and DRAM technologies.

Figure 1:
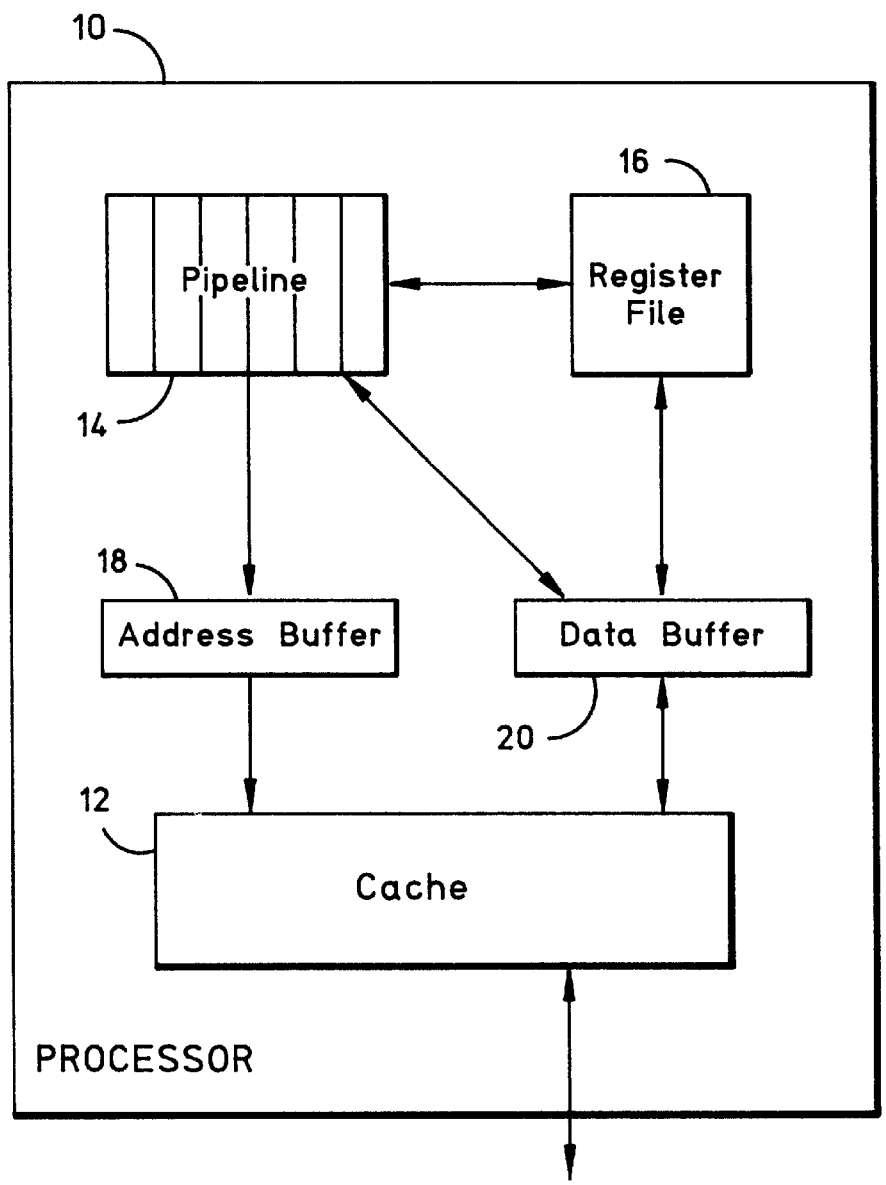
FIG. 1 is a block diagram of a processor having an integral cache that is interfaced to a processor pipeline according to the prior art.
Figure 2:
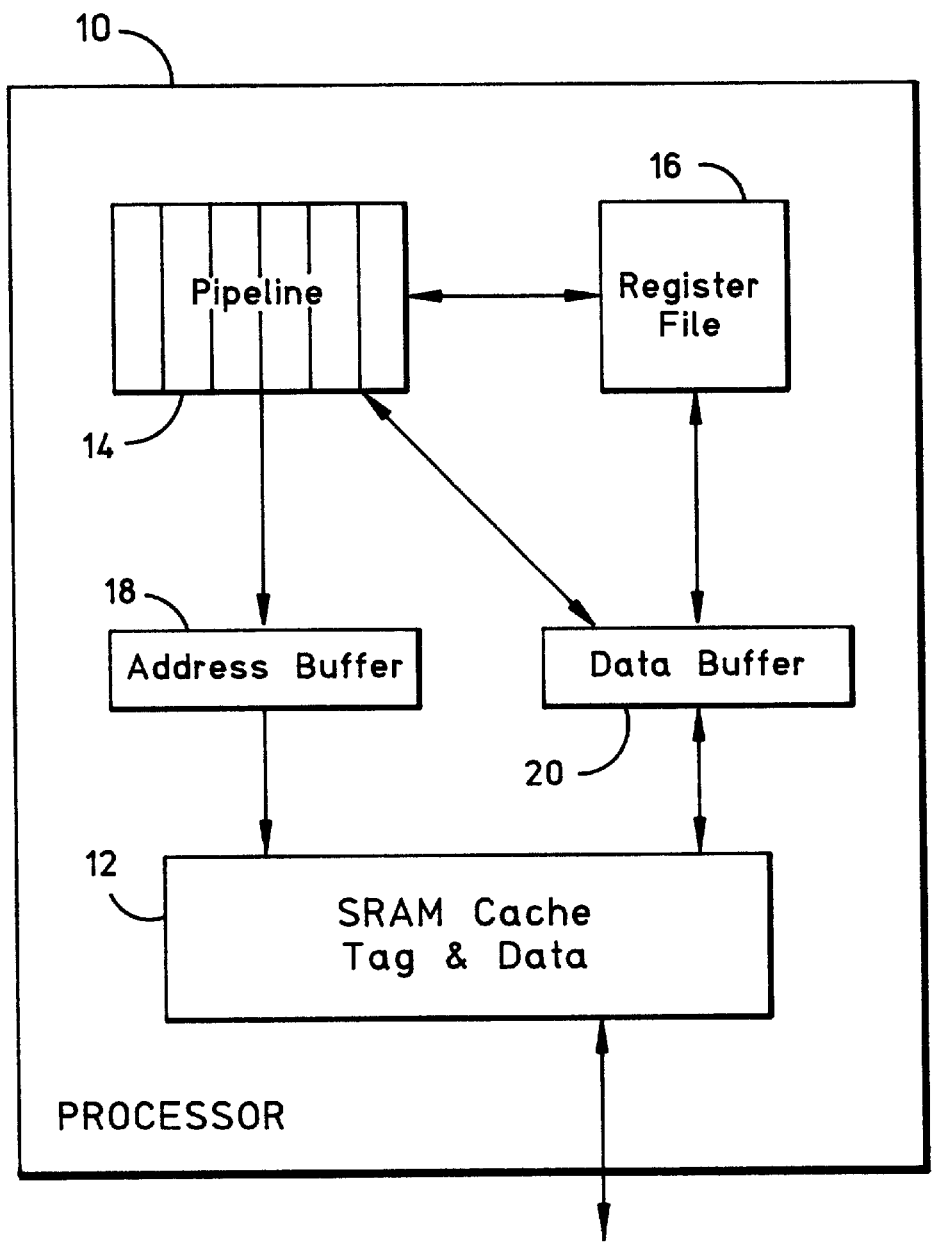
FIG. 2 is a prior art block diagram of a processor having an integral SRAM cache that is interfaced to a processor pipeline.
Figure 3:
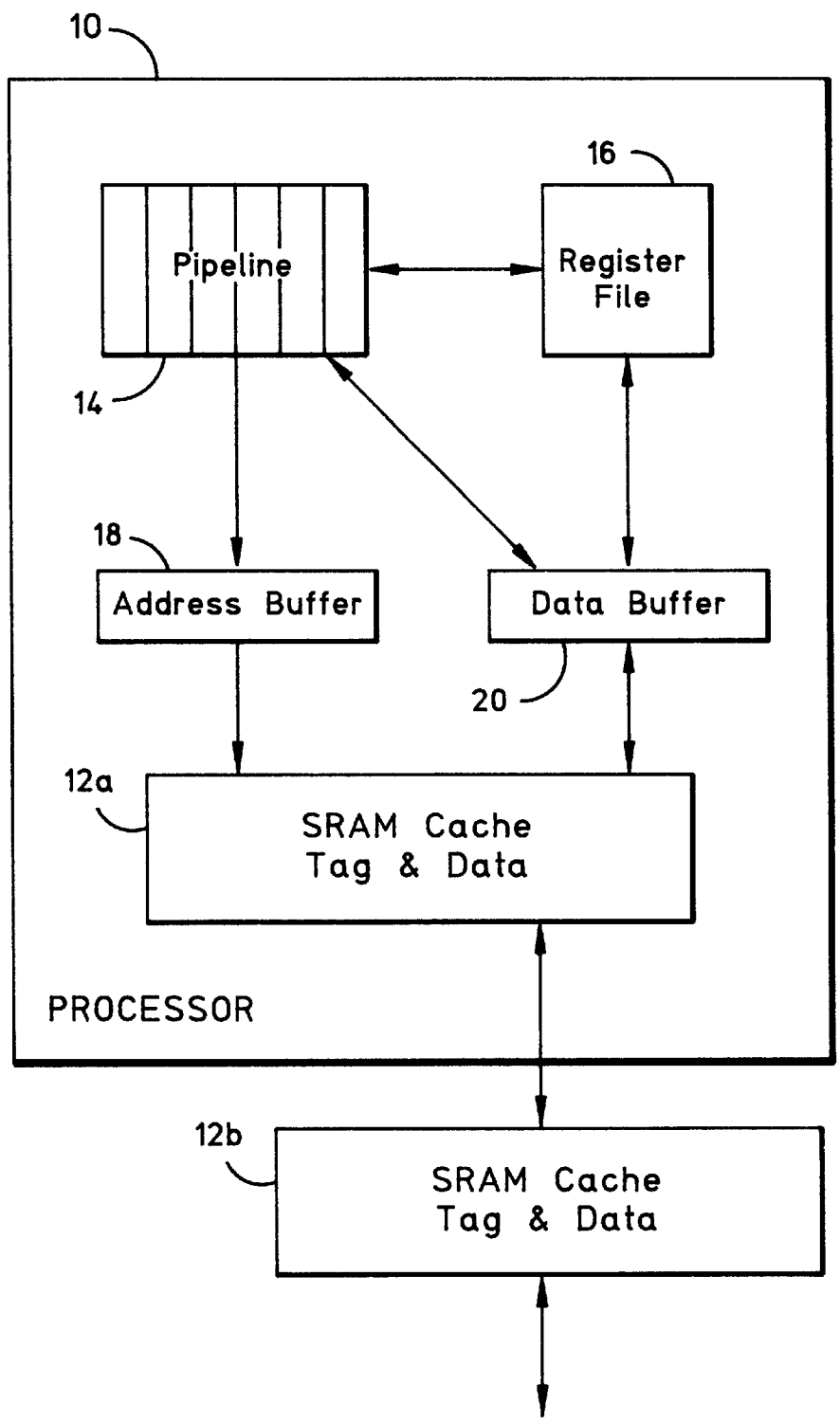
FIG. 3 is a prior art block diagram of a processor having an integral SRAM cache and an external supplemental SRAM cache both of which are interfaced to a processor pipeline.
Figure 8:
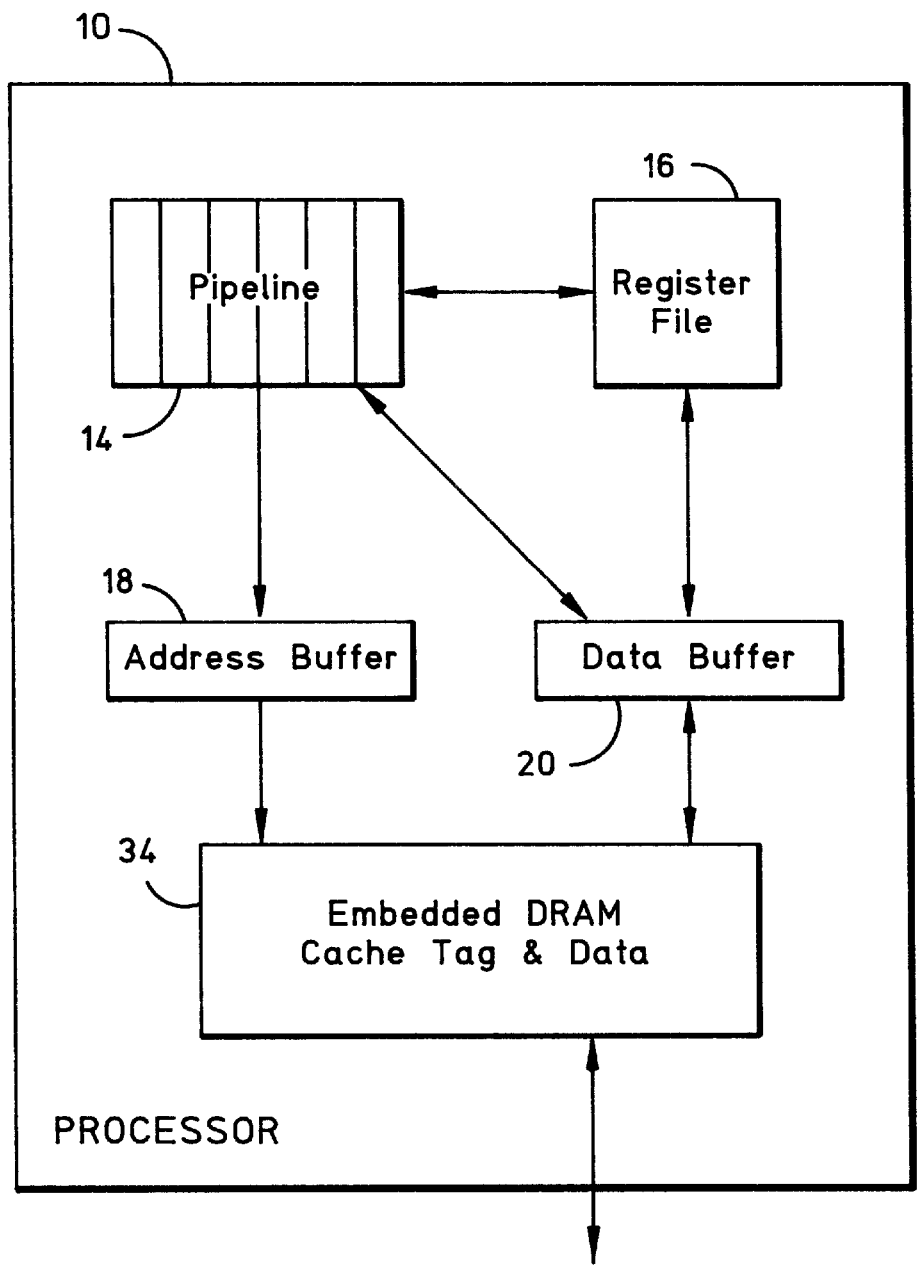
FIG. 8 is a block diagram of a processor having an embedded DRAM cache containing cache tag and cache data that is interfaced to a processor pipeline according to another embodiment of the present invention.

With reference to FIG. 8, a block diagram of a processor 10 having an embedded DRAM cache 34 containing cache tag and cache data that is interfaced to a processor pipeline 14 according to one embodiment of the present invention is shown. As above with respect to FIGS. 1–3, the processor 10 further consists of a register file 16, an address buffer 18, and a data buffer 20. Such an implementation is able to meet the stringent time requirements of the processor.

Figure 9:
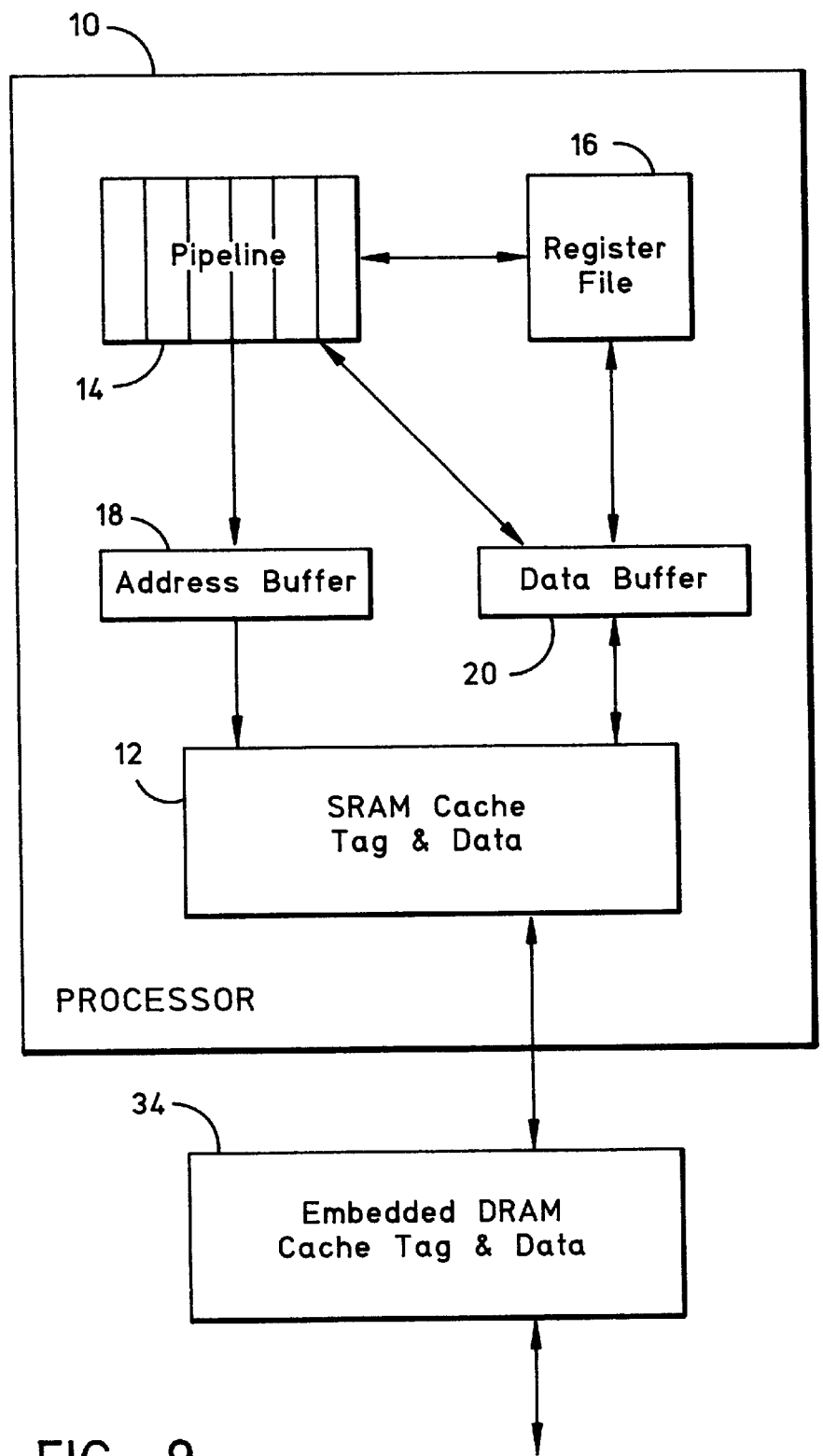
FIG. 9 is a block diagram of a processor having an integral SRAM cache containing cache tag and cache data and an external embedded DRAM cache containing cache tag and cache data both of which are interfaced to a processor pipeline according to a further embodiment of the present invention.

FIG. 9 is a block diagram of a processor 10 having an integral SRAM cache 12 containing cache tag and cache data and an external embedded DRAM cache 34 containing cache tag and cache data, both of which are interfaced to a processor pipeline 14 according to another embodiment of the present invention. Note that the processor 10 is essentially the same as that shown in FIGS. 2 and 3 above. In this configuration, the integral SRAM cache 12 would serve as level-1 cache in the hierarchical memory structure while the external embedded DRAM cache 34 would serve as level-2 cache. The external embedded DRAM cache 34 may be embedded in any of a number of other logic chips (not shown) that are connected to the processor 10.

Figure 4:
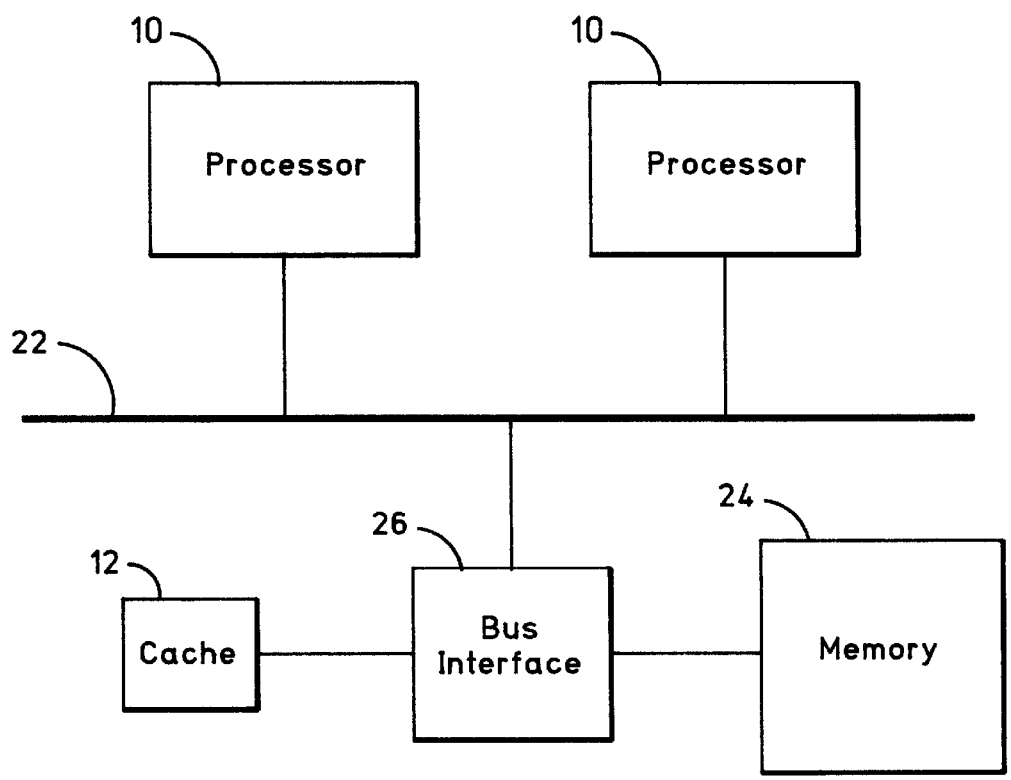
FIG. 4 is a prior art block diagram of a cache external to a processor and interfaced with a shared bus.
Figure 10:
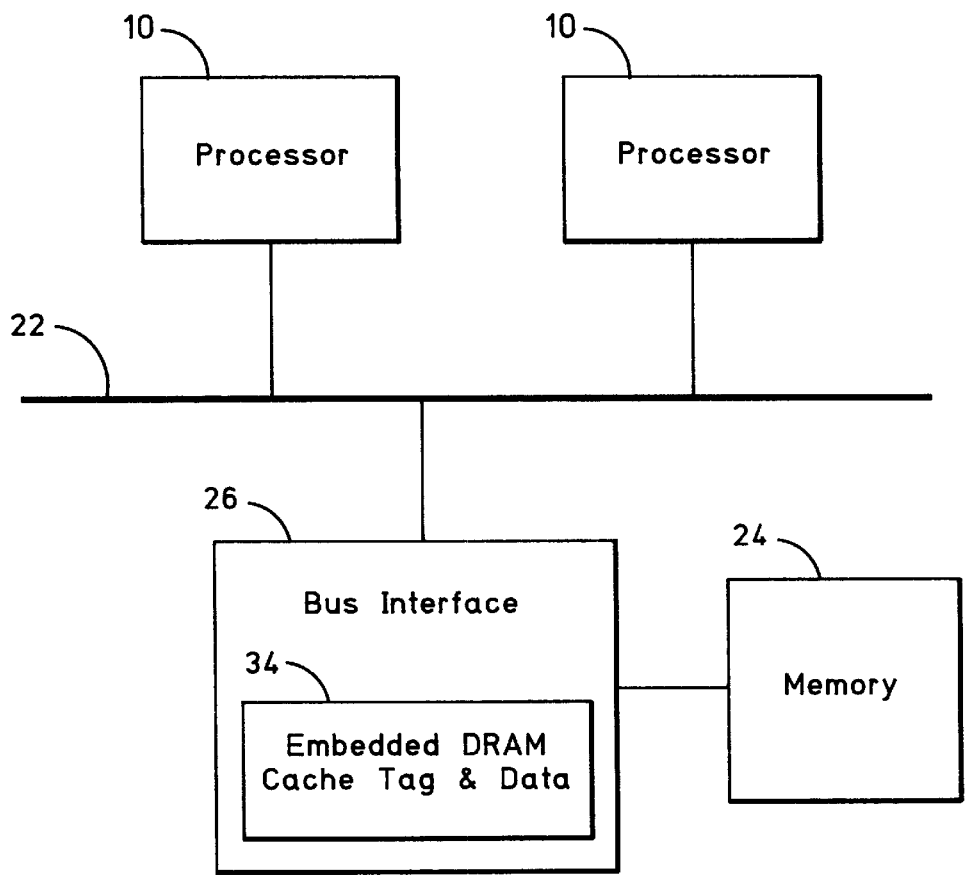
FIG. 10 is a block diagram of an embedded DRAM cache containing cache tag and cache data which is integral to a bus interface which is external to a processor and interfaced with a shared bus according to yet another embodiment of the present invention.
Figure 11:
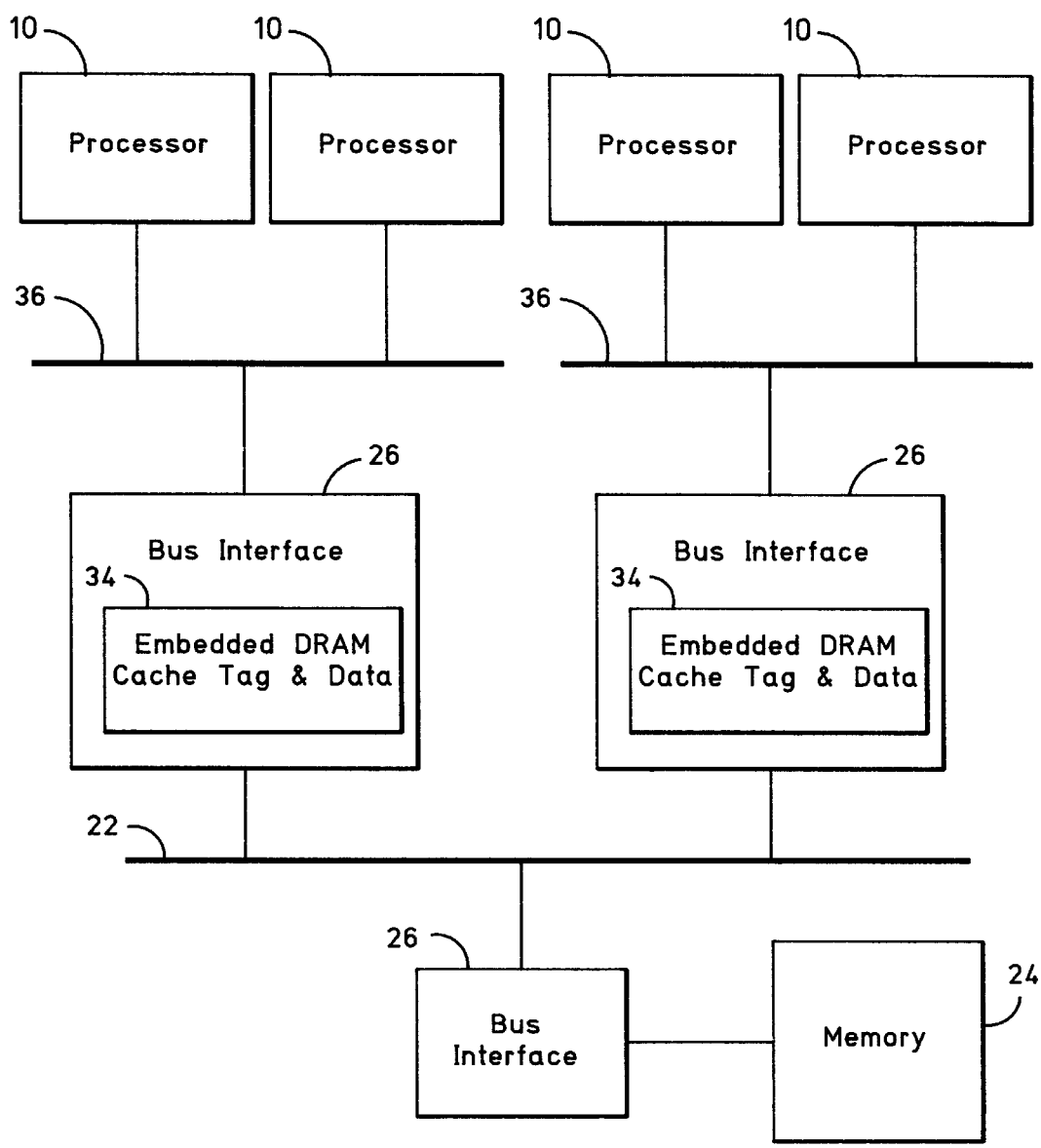
FIG. 11 is a block diagram of a pair of embedded DRAM caches containing cache tag and cache data each of which is integral to one of a pair of bus interfaces each of which is external to a processor and interfaced with a shared sub-bus according to a further embodiment of the present invention.

Turning now to FIGS. 10 and 11, block diagrams of caches external to a processor and interfaced with a shared bus are shown. The implementation shown in FIG. 10 is for a single shared bus while the implementation shown in FIG. 11 is for a hierarchical shared bus. FIG. 10 shows an embedded DRAM cache 34 containing cache tag and cache data which is integral to a bus interface 26 which is external to a processor 10 and interfaced with a shared bus 22 according to a further embodiment of the present invention. FIG. 11 is a block diagram of a system having a pair of embedded DRAM caches 34 containing cache tag and cache data, each of which is integral to one of a pair of bus interfaces 26, each of which is external to a processor 10 and interfaced with a shared sub-bus 36, according to still another embodiment of the present invention. As above with respect to FIGS. 4–6, also interfaced with the shared bus 22 is a memory 24. Both such implementations support faster access to cache data than conventional approaches while continuing to meet the requirements of the shared bus.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A computer system comprising:
   a processor having embedded logic;
   a cache memory comprising a DRAM embedded in the processor wherein at least a portion of the cache data is stored in the embedded DRAM and wherein at least a portion of the cache tags are stored in the embedded DRAM;
   wherein the processor includes an address buffer coupled to the embedded DRAM, a data buffer coupled to the embedded DRAM, a register file coupled to the data buffer, and a pipeline coupled to the address buffer, the data buffer, and the register file.

2. A shared bus computer system, comprising:

at least one shared bus;

at least one processor coupled to the bus;

a bus interface having embedded logic coupled to the at least one shared bus;

a cache memory comprising a DRAM embedded in the bus interface wherein at least a portion of the cache data is stored in the embedded DRAM and wherein at least a portion of the cache tags are stored in the embedded DRAM;

a second shared bus coupled to the bus interface;

a second bus interface coupled to the second shared bus;

a memory coupled to the second bus interface;

a third bus interface having embedded logic coupled to the second shared bus;

a second cache memory comprising a second DRAM embedded in the third bus interface wherein at least a portion of the second cache data is stored in the embedded DRAM and wherein at least a portion of the second cache tags are stored in the embedded DRAM;

a third shared bus coupled to the third bus interface; and a second processor coupled to the third shared bus.

3. The shared bus computer system according to claim 2, further comprising a second processor connected to the at least one shared bus.

4. The shared bus computer system according to claim 2, further comprising a third processor coupled to the at least one shared bus.

5. The shared bus computer system according to claim 2, further comprising a third processor coupled to the third shared bus.

6. The shared bus computer system according to claim 2, further comprising:

a third processor coupled to the at least one shared bus; and a fourth processor coupled to the third shared bus.

* * * * *